United States Patent [19]

Carter et al.

[11] 4,266,462
[45] May 12, 1981

[54] AIRBORNE STORES ARMING TRIGGER UNIT

[75] Inventors: William R. Carter; Larry G. Ellis, both of Jamestown, N. Dak.

[73] Assignee: Western Gear Corporation, Jamestown, N. Dak.

[21] Appl. No.: 5,476

[22] Filed: Jan. 22, 1979

[51] Int. Cl.³ .................................................. F41F 5/02
[52] U.S. Cl. .................................. 89/1.5 D; 294/83 R
[58] Field of Search ............... 89/1.5 B, 1.5 R; 102/2; 294/83 R

[56] References Cited

U.S. PATENT DOCUMENTS

| | | | |
|---|---|---|---|
| 2,992,594 | 7/1961 | Anderson et al. | 89/1.5 D |
| 3,200,707 | 8/1965 | West | 89/1.5 D |
| 3,831,486 | 8/1974 | Yost | 89/1.5 D |
| 3,998,124 | 12/1976 | Milhous et al. | 89/1.5 D |
| 4,088,055 | 5/1978 | West et al. | 89/1.5 D |

*Primary Examiner*—David H. Brown
*Attorney, Agent, or Firm*—E. Wallace Breisch; Howard E. Sandler

[57] ABSTRACT

An airborne stores arming trigger unit and more particularly an arming trigger unit used in conjunction with bombs and the like which are carried by military aircraft and which arming trigger unit includes improved means for better insuring an unarmed drop of bombs from such aircraft.

10 Claims, 3 Drawing Figures

U.S. Patent May 12, 1981 4,266,462
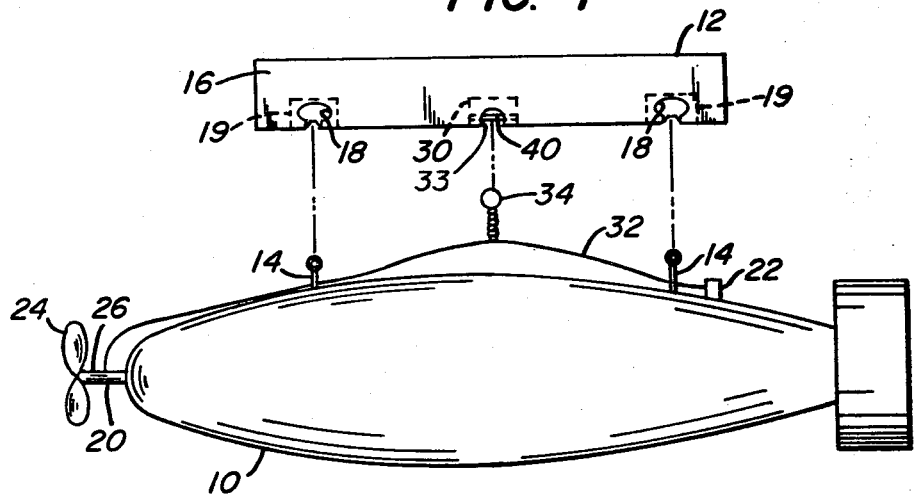
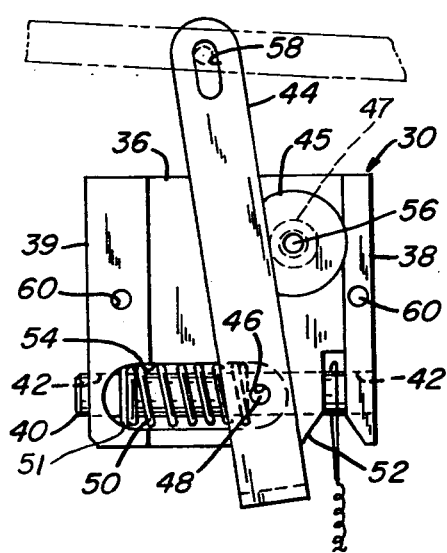 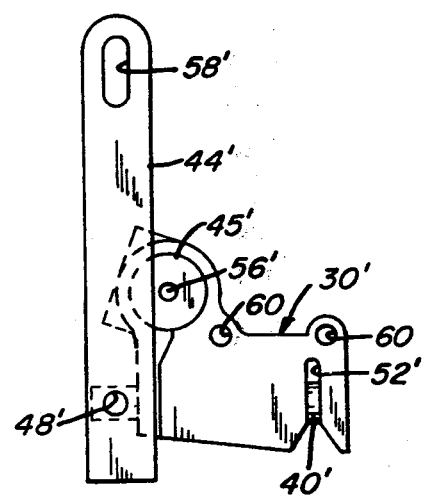

AIRBORNE STORES ARMING TRIGGER UNIT

In normal practice with many types of conventional aircraft a plurality of non-nuclear bombs are carried within bomb bays by shackle assemblies or the like. One shackle assembly is provided for each bomb. The shackle assemblies are in turn suitable carried by the aircraft structure; for example in a modern B-52 bomber, up to eighty four five-hundred pound bombs are carried in bomb racks within the bomb-bay and an additional twelve seven hundred and fifty pound are carried on each wing.

The shackle assemblies serve a dual purpose, namely to releasably support respective bombs in proper dropping orientation and also to releasably support an arming link, lanyard or wire. The arming wire renders the final and secondary arming mechanisms on the bomb inoperative until withdrawn.

Typically a bomb is preliminarily armed after the aircraft is airborne and is over water or an unpopulated land mass. The arming wire will have a mid portion releasably retained by a trigger unit which is carried by the shackle assembly. One end of the arming wire will communicate with a forward final arming propeller. This final arming propeller must rotate a predetermined number of revolutions after drop before the bomb will explode. The arming wire prevents the rotation of the final arming propeller until withdrawn from communication therewith. Many bombs additionally have secondary arming mechanisms adjacent the bomb fins, for example barometric devices for air explosions which will render the bomb finally armed when it reaches a predetermined altitude or timing devices for delay explosions which finally arm the bomb after a preset time has elapsed from drop. Should a secondary arming mechanism be included, the other end of the arming device will communicate with it and prevent its operation until withdrawn from communication therewith.

The trigger unit is the means which renders the final arming propeller and secondary arming assembly operative. This is accomplished by means of a selectively slidable pin which extends through a loop in the mid point in the arming wire. When the bomb is released from the shackle assembly the arming wire is retained by the pin of the trigger unit and the ends of the wire are withdrawn from the arming propeller and secondary arming assembly thus rendering them operative. On the other hand should it be desired to abort a mission and drop inoperative or "dud" bombs, for example when having mechanical or electrical difficulties with the aircraft and being forced to land or lighten the cargo load, the trigger unit is withdrawn and the arming wire is dropped with the bomb. Thus in this latter instance the arming propeller and secondary arming assembly will be maintained inoperative and the bomb will not explode on impact with the ground.

The prior trigger units are normally a single actuation arrangement. In other words should it be desired to release fully armed bombs only the bomb release mechanisms are required to be actuated. The actuation of the bomb release mechanisms would not effect the prior trigger units and the trigger pin thereof stays in position and retains the arming wire when the bomb drops. On the other hand in the event that inoperative or "dud" bombs were desired to be dropped the trigger pin would be withdrawn, via electrical or hydraulic energization to the appropriate linkage, and the arming wire would be released with the dropped bomb.

The prior trigger units such as described hereinabove work independently of the bomb release mechanism and are energized only when it is determined that an inoperative or "dud" bomb is to be released. This arrangement suffers from potential hazards of mechanical, electrical or human error when it is desired to insure that dud bombs are released. In otherwords, should the trigger pin of these prior trigger units inadvertantly not be withdrawn, a live fully armed bomb will be dropped with potential catastrophic consequences.

By means of the present invention which includes a dual actuation trigger unit, the unit is responsive to the energization of the bomb release mechanism as well as to an independent safety mechanism before a live fully armed bomb will be released. This arrangement will greatly reduce the possibility of dropping live fully armed bombs when a dud release is in fact intended.

These and other advantages of the present invention will become more readily apparent upon a reading of the following description and drawings in which:

FIG. 1 is a schematic partially exploded representation of a bomb carried by a shackle assembly and which utilizes an airborne stores arming trigger unit of the present invention;

FIG. 2 is a side elevational view of an airborne stores arming trigger unit constructed in accordance with the principles of the present invention; and FIG. 3 is a side elevational view of another embodiment of the arming trigger unit of the present invention.

FIG. 1 is a schematic partially exploded representation of an elongated bomb 10 which is releasably supported by a suitable elongated shackle assembly 12. Shackle assembly 12 is adopted to be suitably secured to well known bomb-bay bomb racks or exterior wing bomb racks. A pair of longitudinally spaced support elements, such as eye bolts 14 are secured to the upper surface of bomb 10. Shackle assembly 12 is of a generally well known construction and includes a pair of transversely spaced side plates 16 (only one of which is shown) with suitable transverse struts (not shown) extending between side plates 16 to form a rigid hollow structure. Side plates 16 include downwardly open formed openings 18 therein which are longitudinally spaced to coincide with the longitudinal spacing of eye bolts 14.

Known bomb release mechanisms, schematically illustrated at 19, are received between side plates 16 adjacent openings 18. Eye bolts 14 are cooperable with release mechanisms 19 for the releasable supporting of bombs 10 by bolts 14 being received within openings 18 and being retained therein by adjacent elements of release mechanisms. When it is desired to drop the bombs, a suitable bomb release linkage is energized in a well known manner to retract the adjacent elements of mechanisms 19 from supporting contact with bolts 14.

After the aircraft is airborne the bombs 10 are preliminarily armed; however, each bomb 10 additionally includes a final arming mechanism 20 and, if desired, a secondary arming mechanism 22. In FIG. 1 the final arming mechanism 20 is schematically shown as an arming propeller 24 which is rotatably supported by a shaft 26 adjacent the forward end of the bomb 10. Mechanism 20 is operable to finally arm the bomb 10 after drop and after a predetermined number of revolutions of propeller 24. Secondary arming mechanism 22 is generally of the barometric or timing variety which will further arm the bomb 10 when it is dropped to a predetermined altitude or a predetermined time has elapsed after dropping from the aircraft.

Both mechanisms 20 and 22 are rendered operable by the airborne stores trigger unit 30 of the present invention. Accordingly the selective operation of trigger unit 30 will determine whether or not bomb 10 is dropped in a fully armed mode or in an unarmed or "dud" mode. Trigger unit 30 communicates with mechanisms 20 and 22 by means of a suitable arming link, lanyard or wire 32. As shown arming wire 32 is simply a length of copper wire or the like which is twisted at the midpoint thereof to form a loop 34 which is releasably retained by trigger unit 30. One axial end of wire 32 communicates with final arming mechanism 20 to prevent arming propeller 24 from rotating and the other axial end of wire 32 communicates with secondary arming mechanism 22 to render it inoperative.

The invention herein is primarily directed to the operation and construction of trigger unit 30 and the balance of the elements discussed hereinabove are generally well known in the art both as to operation and construction. Accordingly, a detailed description of such latter mentioned elements is not necessary for an understanding of the invention herein by those knowledgeable in the art and any additional description thereof will only be given hereinafter when necessary for purposes of describing trigger unit 30.

Side plates 16 additionally include downwardly open formed openings 33 therein longitudinally intermediate openings 18. Trigger unit 30 is received between side plates 16 adjacent openings 33 and, as shown in FIG. 2 comprises: a vertically orientated body or web member 36 extending horizontally between a spaced pair of end or flange members 38 and 39; a horizontally extending trigger pin 40 which has the respective axial ends thereof slidable within respective coaxially aligned bores 42 which extend horizontally through flange members 38 and 39; a generally vertically extending lever arm 44 which is pivotally connected adjacent the lower end thereof to trigger pin 40; and a selectively operable safety means, such as a solenoid operable shaft assembly 45, which is cooperable, in a manner described hereinafter, with lever arm 44 to result in the retention or release of the arming wire 32 with respect to trigger unit 30. When a bomb 10 is dropped and the arming wire 32 is retained by trigger unit 30, arming mechanisms 20 and 22 will be rendered operative by pulling free from communication with the respective axial ends of arming wire 32 and the bomb 10 will be fully armed. On the other hand should arming wire 32 be released from trigger unit 30 the wire 32 will fall with the bomb 10 and the arming mechanisms will remain inoperative. Thus, in the latter instance the bomb will be a dud and will not explode upon impact.

Trigger pin 40 includes a transversly extending bore therethrough intermediate the axial ends thereof. Lever arm 44 includes a transverse bore 46 therethrough adjacent the lower end portion thereof. Bore 46 is coaxially aligned with the above mentioned bore through trigger pin 40 and a pivot pin 48 is recieved within the aligned bores and retained therein in any suitable manner; for example, cotter pins adjacent the axial ends thereof. If desired, lever arm 44 may be formed with a "J" shaped configuration such that pivot pin 48 may be supported by arm 44 on both sides of web member 36.

A suitable biasing means such as longitudinally extending spring 50 is disposed around trigger pin 40 intermediate pivot pin 48 and a spring seat 51 adjacent the flange member 39 (as shown in FIG. 2 the flange member 39 is axially spaced to the left of flange member 38). Thus the spring will normally bias the trigger pin 40 towards the right flange member 28 and into the respective bore 42 thereof.

The lower right corner portion (as shown in FIG. 2) of web member 36 includes an upwardly extending cut 52 which extends upwardly of trigger pin 40. Cut 52 permits the loop 34 to be received within trigger unit 30 and retained therein by trigger pin 40 passing therethrough and into the adjacent bore 42. Web member 36 and the left flange member 39 includes a continuously formed generally oval shaped opening 54 in the vicinity of the spring 50 to permit the sliding of trigger pin 40 as will be described hereinafter.

The solenoid operable shaft assembly 45 is supported by web member 36 upwardly of cut 52 and to the right of lever arm 44. Assembly 45 includes a shaft member 56 which is selectively reciprocable, in a direction generally normal to the planar extent of web member 36, in response to a suitable electrical signal received by assembly 45. Assembly 45 includes means schematically illustrated by spring 47 in FIG. 2, to normally bias shaft member 56 outwardly when assembly 45 is unenergized. When assembly 45 is energized, the solenoid force over comes the bias of on shaft member 56 and reciprocates member 56 inwardly. Assembly 45 is so structured and positioned that when lever arm 44 is rotated to pivot about pivot pin 48 in a clockwise direction, the shaft member 56 will interrupt such pivoting when the assembly 45 is unenergized and, when assembly 45 is energized, shaft member 56 will withdraw and lever arm 44 can thus pivot about pin 48 past assembly 45.

With a structure of trigger unit 30 as described hereinabove, the sequence of operation thereof when it is desired to drop an unarmed or "dud" bomb is as follows. Lever arm 44 is connected to the operating linkage of bomb release mechanisms 19 in any suitable manner; for example, such linkage may be secured thereto at openings 58 adjacent the upper end of lever arm 44, generally in a manner as is schematically illustrated in phantom in FIG. 2. Energization of the linkage to the bomb release mechanisms 19 will result in a pull on lever arm 49 adjacent openings 58. This pull will result in lever arm 44 pivoting about the pivot pin 48 in a clockwise direction with respect to the embodiment illustrated in FIG. 2. However, during the operational sequence of dropping an unarmed or "dud" bomb, solenoid assembly 45 remains unenergized. Thus, shaft member 56 remains in its normally outwardly biased position and will interfere with the pivotal rotation of lever arm 44. When lever arm 44 rotates to shaft member 56, the leading side of lever arm 44 will engage shaft member 56. The pull on lever arm 44 continues; however, shaft member 56 now acts as a fulcrum with respect to lever arm 44 and rather than arm 44 continuing to pivot about pivot pin 48, the lower end portion of lever arm 44 will now overcome the bias of spring 50 and cause the trigger pin 40 to slide to the left and withdraw from the bore 42 in flange member 38. As the trigger pin 40 continues its leftward sliding movement, it releases the loop 34 of arming wire 32. Thus arming wire 32 will now drop with the bomb 10 and the bomb 10 will be unarmed.

When it is desired to drop a fully armed bomb 10, the trigger unit 30 of this invention offers a significant safety advantage over prior trigger units by better insuring that armed bombs will not be dropped when it is in fact intended to drop unarmed or "dud" bombs. Specifically, the linkage to bomb release mechanisms 19 is energized and results in the above mentioned pull on lever arm 44 to pivot arm 44 about pivot pin 48. During the operational sequence of dropping an armed bomb, the solenoid assembly 45 must be energized. This energization will result in shaft member 56 withdrawing inwardly. Thus lever arm 44 will continue to pivot about the pivot pin 48 and will not result in trigger pin 40 sliding and releasing the loop 34 of arming wire 32. Accordingly arming wire 32 will be retained by trigger unit 30 and the ends thereof withdrawn from the arming mechanisms 20 and 22 when the bomb 10 drops.

Prior trigger units for selectively retaining and releasing the arming wire 32 were only acted on, either mechanically or electrically, when it was desired to drop an unarmed or "dud" bomb. Thus if such prior units were inoperative because of mechanical or electrical or problems or because of personal error, it was conceivable to drop an armed bomb 10 when in fact it was intended to drop an unarmed bomb. On the other hand, through the use of the trigger unit 30 of the present invention, the unit must be energized and operative before an armed bomb 10 can be dropped.

FIG. 3 illustrates an alternative embodiment of a trigger unit 30' of the present invention which is substantially identical in operation to the trigger unit 30 described hereinbefore. The primary distinction between units 30' and 30 is that in unit 30' the lever arm is operative on trigger pin 40' adjacent the axial end thereof spaced furthest from cut 52'. Appropriate adjustments are made to the general structural configuration of unit 30' from that of unit 30 described hereinabove because of the alternative location of lever arm 44'. For reference, elements of unit 30' which are similar in operation to elements of unit 30 are identified by identical reference numerals primed. Both units 30 and 30' are retained in operational position intermediate the side plates 16 of shackle assembly 12 in any suitable manner; for example by fastening means communicating between respective side plates 16 and blind threaded bores 60 in units 30 and 30'.

The invention described herein is to the presently preferred embodiments and is primarily directed to an airborne stores arming trigger unit having an improved operation wherein an independent means must be energized, in addition to the bomb release mechanisms, in order for a fully armed bomb to be droped from an aircraft. Accordingly, it is understood that various modifications may be made by those knowledgeable in the art to the preferred embodiment discussed hereinabove without departing from the scope of the invention which is defined by the claims setforth hereinafter. For example: other forms of electrically or hydraulically operable mechanical assemblies may be substituted for solenoid operable shaft assembly 45; the trigger pin 40 may be formed in a stepped cylindrical fashion to provide stop limits for the pin travel as well as an integrally formed seat for spring 50; other forms of biasing means may be substituted for spring 50; lever arm 58 may be made rotatable by linkage other than that connecting directly with the bomb release mechanisms 19; and the like.

We claim:
1. An airborne stores arming trigger unit of the type adapted to be carried by the structure of a military aircraft and operable to selectively carry a connecting means which maintains the final arming means of a bomb inoperative until withdrawn therefrom, comprising: a body member; actuatable trigger means carried by said body member for selectively retaining such connecting means; first selectively actuatable release means cooperable with said trigger means; second selectively actuatable release means carried by said body member and selectively cooperable with said first release means, said second release meansbeing selectively actuatable independently of said first release means; said first and second release means being cooperable such that upon actuation of only said first release means, said trigger means releases the retention thereof of such connecting means and that upon actuation of both of said first and second release means, said trigger means remains unactuated and maintains the support thereof of said connecting means.

2. An airborne stores arming trigger unit as specified in claim 1 wherein said trigger means comprises: a slidable trigger pin; and biasing means for biasing said trigger pin in one direction to retain such a connecting means.

3. An airborne stores arming trigger unit as specified in claim 2 wherein said first release means includes a lever arm having one end portion thereof pivotally connected to said trigger pin.

4. An airborne stores arming trigger unit as specified in claim 3 wherein during actuation of both of said first and second release means, said lever arm freely rotates about said pivot pin.

5. An airborne stores arming trigger as specified in claim 4 wherein during actuation of only said first release means, said lever arm acts on said pivot pin to overcome said biasing means and slide said trigger means in a direction opposite said one direction to release such a connecting means.

6. An airborne stores arming unit as specified in claim 5 wherein said second release means includes a fulcrum pin selectively reciprocable to engage said lever arm when only said first release means are actuated and to withdraw from said engagement when both of said release means are actuated.

7. An airborne stores arming unit as specified in in claim 6 including other biasing means to continuously bias said fulcrum pin in a direction which will provide said engagement.

8. An airborne stores arming unit as specified in claim 7 wherein said second release means is a solenoid assembly and said fulcrum pin is a central shaft of said solenoid assembly.

9. An airborne stores arming unit as specified in claim 8 wherein when said solenoid assembly is energized, said fulcrum pin overcomes the bias of said other biasing means and withdraws in a direction opposite said direction which will provide said engagement.

10. An airborne stores arming unit as specified in claim 9 wherein the end of said lever arm opposite said one end portion is adapted to communicate with the bomb release linkage of such an aircraft and said actuation of said first release means is in response to movement of such bomb release linkage.

* * * * *